United States Patent [19]

Hofmann

[11] E Re. 28,601

[45] Reissued Nov. 4, 1975

[54] METHOD AND APPARATUS FOR AUTOMATIC BALANCING OF MOTOR VEHICLE WHEELS

[75] Inventor: Dionys Hofmann, Darmstadt-Marienhohe, Germany

[73] Assignee: Dionys Hofmann, GmbH Maschinenfabrik, Germany

[22] Filed: Sept. 25, 1973

[21] Appl. No.: 400,683

Related U.S. Patent Documents

Reissue of:

[64] Patent No.: 3,748,910
Issued: July 31, 1973
Appl. No.: 151,584
Filed: June 9, 1971

U.S. Applications:

[60] Division of Ser. No. 864,941, Sept. 23, 1969, Pat. No. 3,623,208, which is a continuation-in-part of Ser. No. 800,882, Feb. 20, 1969, abandoned.

[30] Foreign Application Priority Data

Feb. 21, 1968 Germany ..... 77334

[52] U.S. Cl. ..... 73/468; 73/487

[51] Int. Cl. ..... G01m 1/38

[58] Field of Search ..... 73/66, 468, 487

[56] References Cited

FOREIGN PATENTS OR APPLICATIONS 914,753 1/1963 United Kingdom ..... 73/487

*Primary Examiner*—James J. Gill
*Attorney, Agent, or Firm*—Cushman, Darby & Cushman

[57] ABSTRACT

The invention relates to a method for the automatic balancing of motor vehicle wheels in two correction planes where the tire bead is broken at the marked location of unbalance and a holding clip for a balance weight pushed onto the rim flange.

4 Claims, 6 Drawing Figures

METHOD AND APPARATUS FOR AUTOMATIC BALANCING OF MOTOR VEHICLE WHEELS

Matter enclosed in heavy brackets [ ] appears in the original patent but forms no part of this reissue specification; matter printed in italics indicates the additions made by reissue.

[This is a division of application Ser. No. 864,941 filed Sept. 23, 1969, now U.S. Pat. No. 3,623,208, which is a Continuation-in-Part of Ser. No. 800,882 filed Feb. 20, 1969, now abandoned. The invention relates further to a contrivance for carrying out this method.]

*This is a reissue of U.S. Pat. No. 3,748,910 granted July 31, 1973, which was based on application Ser. No. 151,584, filed June 9, 1971, which is a Divisional Under Rule 147 of application Ser. No. 864,941 filed Sept. 23, 1969, now U.S. Pat. No. 3,623,208, which is a Continuation-In-Part of application Ser. No. 800,882 filed Feb. 20, 1969, now abandoned.*

BACKGROUND OF THE INVENTION

Usually, balance weights with separate holding clip are used in the automatic balancing of motor vehicle wheels. This mode of fastening provides over the balance weights with cast integral holding clip, so-called "knock-in weights", a substantially higher safety against being thrown off while motoring. Owing to the separation of holding clip and balance weight, however, difficulties are experienced in the fitting of these two parts in an automatic balancing operation.

The German Pat. No. 1,084,494 describes a contrivance by which a balance weight and a holding clip are so applied to the rim flange of a motor vehicle wheel kept horizontal that one leg of the holding clip comes to lie between the tire and the rim flange while the other leg of the clip embraces the balance weight and presses it against the rim curvature. A clamp provided in connection therewith compresses the tire at a given point to facilitate the insertion of the holding clip. Suitable contrivances feed and secure them automatically in the same operation the balance weight and the holding clip. Here, the balance weight is inserted at a point which has been marked from hand in a previous working cycle in accordance with the results given by a measuring device. With this contrivance, the holding clip and the balance weight are fed from above. As it is becoming more and more practice of late to balance also motor vehicle wheels not in one but in two planes, the use of said contrivance in automatic balancing such as on a transfer line requires that the motor vehicle wheel be inverted to permit the application of the balance weights in the second plane. This means, however, another working cycle from which will ensue an appreciable increase in the price of the transfer line.

Basically, it is possible that the holding clip and the balance weight can be fed and inserted from below in the downward facing correction plane. However, as difficulties were experienced because of the unstable position of the holding clip which made the clip frequently tilt, the insertion of the clips from below was avoided until now.

SUMMARY OF THE INVENTION

The underlying object of the present invention is to propose an automatic balancing method for the balancing of motor vehicle wheels mounted in horizontal position and a contrivance for carrying out this method by which working cycles can be omitted. This problem is solved in that directly after determination of the unbalance, the location of the unbalances in the correction planes is successively turned to an insertion device, a holding clip is pushed onto the rim flange with a simulated balance weight as supporting element being pushed into at least the lower correction plane and being removed upon release of the tire, followed by the application of a balance weight of corresponding size. The device for inserting the holding clips used according to the invention is characterized in that each leg end of the clamp is associated with a clip holder and at least for the lower correction plane a hammer which can be swung into the holding clip in the plane of insertion. The hammer is preferably pressed on resiliently.

Experiences with the known clip inserting devices which do not perform simultaneously the fitting of the balance weight under the clip in the same operation, have shown that upon the release of the clip feeding device and the detachment of the tire compression clamp, the occurring flexing may cause the holding clip to take different positions which renders difficult the ulterior insertion of the balance weights. The suggested method does away with this shortcoming.

BRIEF DESCRIPTION OF THE INVENTION

The innvention is more fully illustrated by the enclosed drawings in which

GENERAL DESCRIPTION

Figure 1:
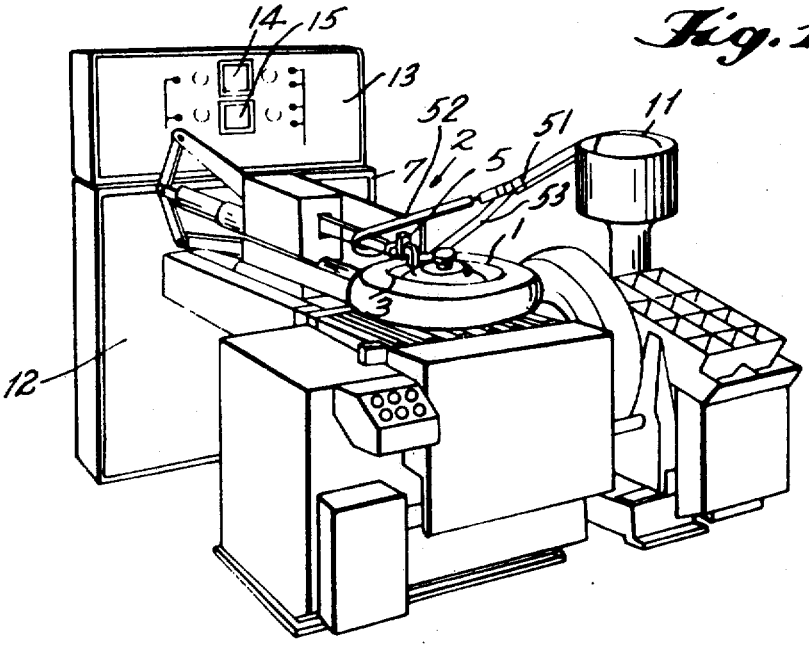
FIG. 1 is a general view of a known automatic balancing device.

A motor vehicle wheel 1 is mounted in horizontal position on a balancing installation commonly marked 2. The amount and angular location of the unbalance present in both sides of the motor vehicle wheel 1 are determined in known manner. The amount of unbalance is indicated on the instruments 14 and 15 of the measuring device 13 which is arranged on a control cubicle 12. While the instrument 14 registers the amount of unbalance in the upper wheel side, instrument 15 gives a reading of the amount of unbalance in the lower wheel side. However, the measured values of the amount of unbalance in both wheel sides are stored and the related angular locations as well. Subsequently to the stopping of the drive, the stored readings of the angular locations control a positioning device in that first the light point of the upper wheel side is turned to the inserting plane of an inserting device commonly marked 5. Such positioning devices are known and have been described in detail for example in the document 1 020 814 laid open to public inspection in Germany.

Following the positioning of the motor vehicle wheel 1, the tire is pushed off the rim near its two side walls and a holding clip is slipped over the rim flange edge in situ of the unbalance. thereupon, the light point of the lower wheel side is turned to the inserting plane and upon pushing the tire off the rim near its two side walls, a second holding clip is applied at the location of the unbalance in the lower wheel side.

As soon as both clips are inserted, the wheel will be removed from the balancing installation 2 and tilted into a gap between the balancing installation and the weight stock bin where the required balance weights are pushed under the holding clips. The size of the weights to be applied will be seen from the indication on the meters 14 and 15 of the measuring device 13.

DESCRIPTION AND FUNCTION OF AUTOMATIC INSERTING DEVICE

The inserting device consists in two assemblies operating independently from each other, specifically a tire compression device and clip inserting device. The tire compression device is made up of an upper compression lever 8 and a lower compression lever 20 which can be operated simultaneously by means of the piston and cylinder arrangement 25, 27. The levers are carried in the bearings 18, 19 and pivotally connected with the casing 17 which supports flanged thereto also the pneumatic cylinder 25. If the tire compression device is in its normal position or open (as shown in the lower half of FIG. 2), the piston 27 and therewith also the yoke 24 is in the left end position. The levers 8 and 20 which are directed by the lever 22 and 21, respectively, and are pivoted in the hinges 26 and 28, have the smallest possible distance to each other to effect that the two other arms of the levers 8 and 20 are spread apart sufficiently for an easy mounting of the tire 16.

By operating thereupon the piston and cylinder arrangement 25, 27 the right arms of the levers 8 and 20 move toward each other. The minimum distance between the front end 29 and the comparable end (not shown, below the plate 32) respectively, of the two levers 8 and 20 is maintained by limit switches in the usual way. The control elements for the insertion of the clip are arranged on the mounting plate 32 which is screwed on the casing 17. The piston and cylinder arrangement 33 actuates the displaceably fixed plate 39 by means of the angle lever 35 which is hinged in the yoke 34 and pivoted in the bearing 36. Plate 39 is directed by the strips 40 and 41. The clip holder 9 is firmly connected with the plate 39 which also carries the control means of the hammer 10. The piston and cylinder arrangement 44 effects that the hammer 10 by means of the yoke 45 and the angle lever 46 is swing to the left over the clip holder 9. The hammer 10 and the bolt 48 are not firmly connected with the angle lever 46 but the bolt 48 with the hammer 10 is displaceable lengthwise in the angle lever 46 against the tension of the spring 47. The bolt 18 carrying the hammer 10 is shaped squarely in order to prevent it from turning round. The travel of the plate 39 and consequently of the clip holder 9 between the guides 40 and 41 is limited in the usual way by limit switches 49 and 50. The sweep of the hammer 10 is a function of the maximum path of the piston and cylinder arrangement 44.

Figure 2:
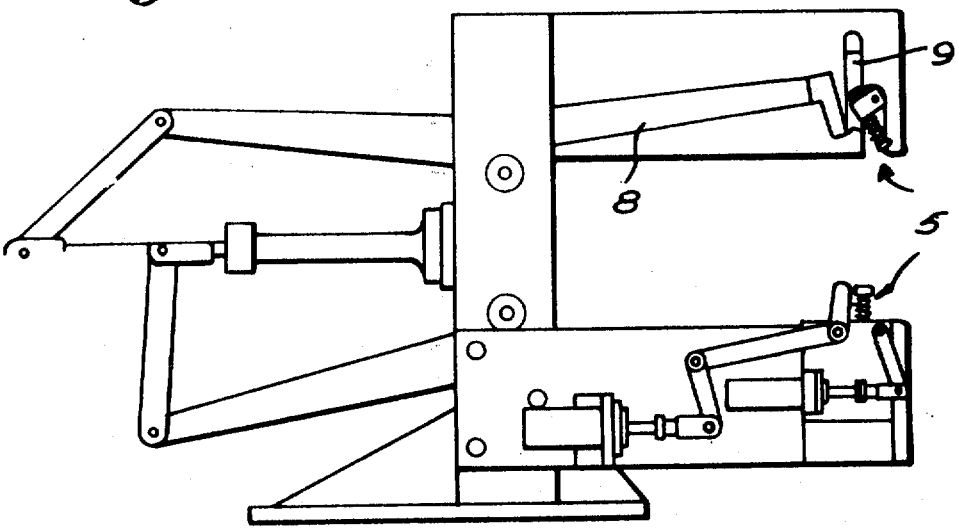
FIG. 2 is a side view of a correction device according to the invention.
Figure 3:
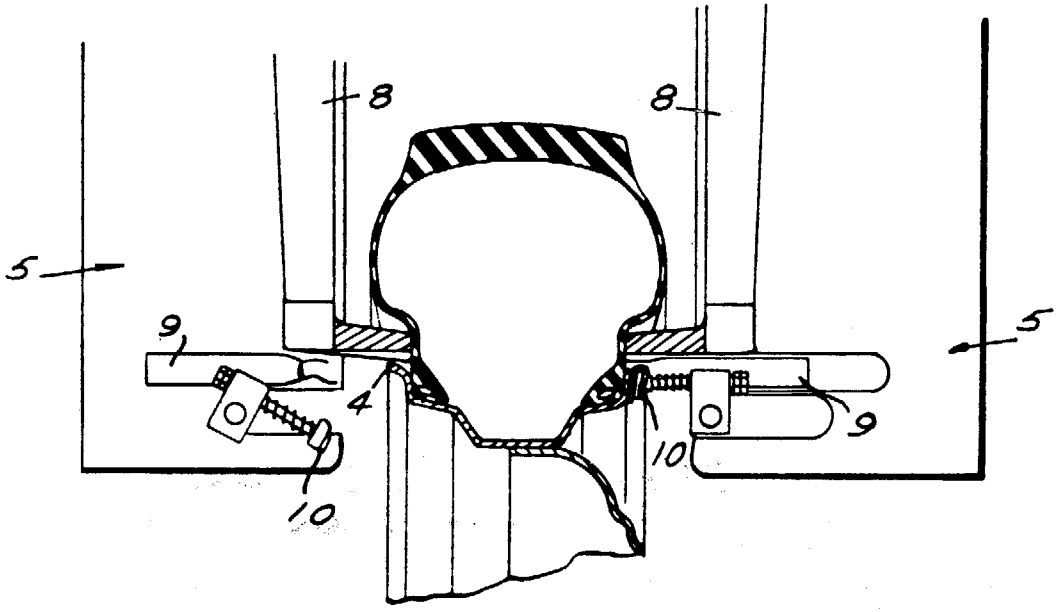
FIG. 3 is a representation of the operation of inserting the holding clip.
Figure 4:
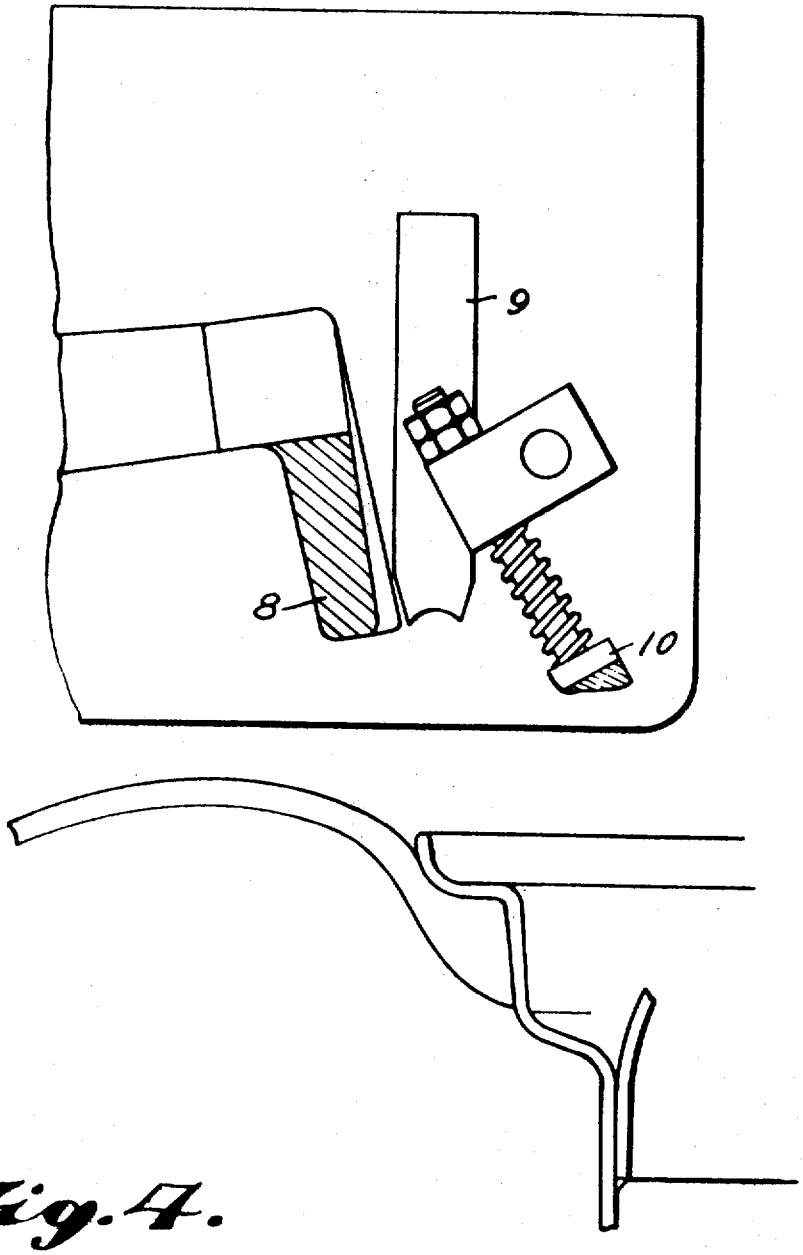
FIGS. 4 and 5 are additional enlarged representations from which can be noted the operation of the single component parts of the device in the inserting process.
Figure 5:
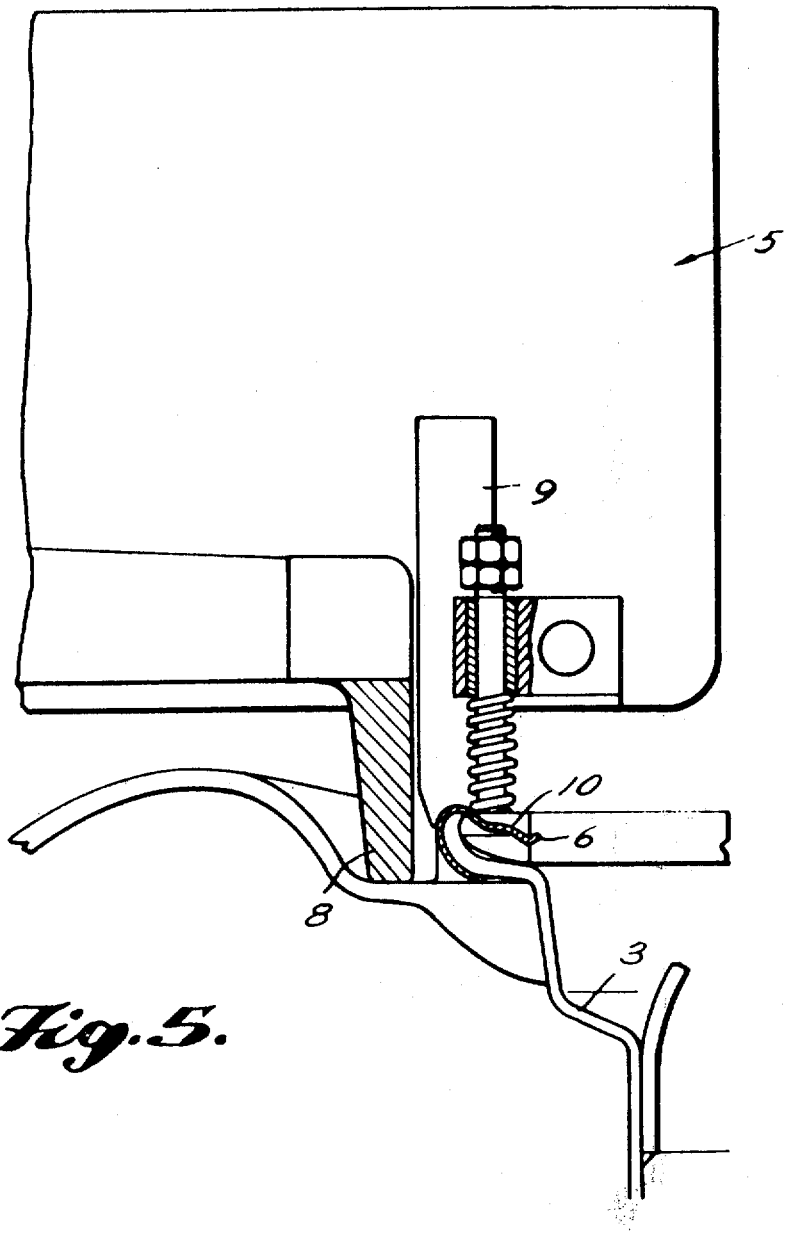
Figure 6:
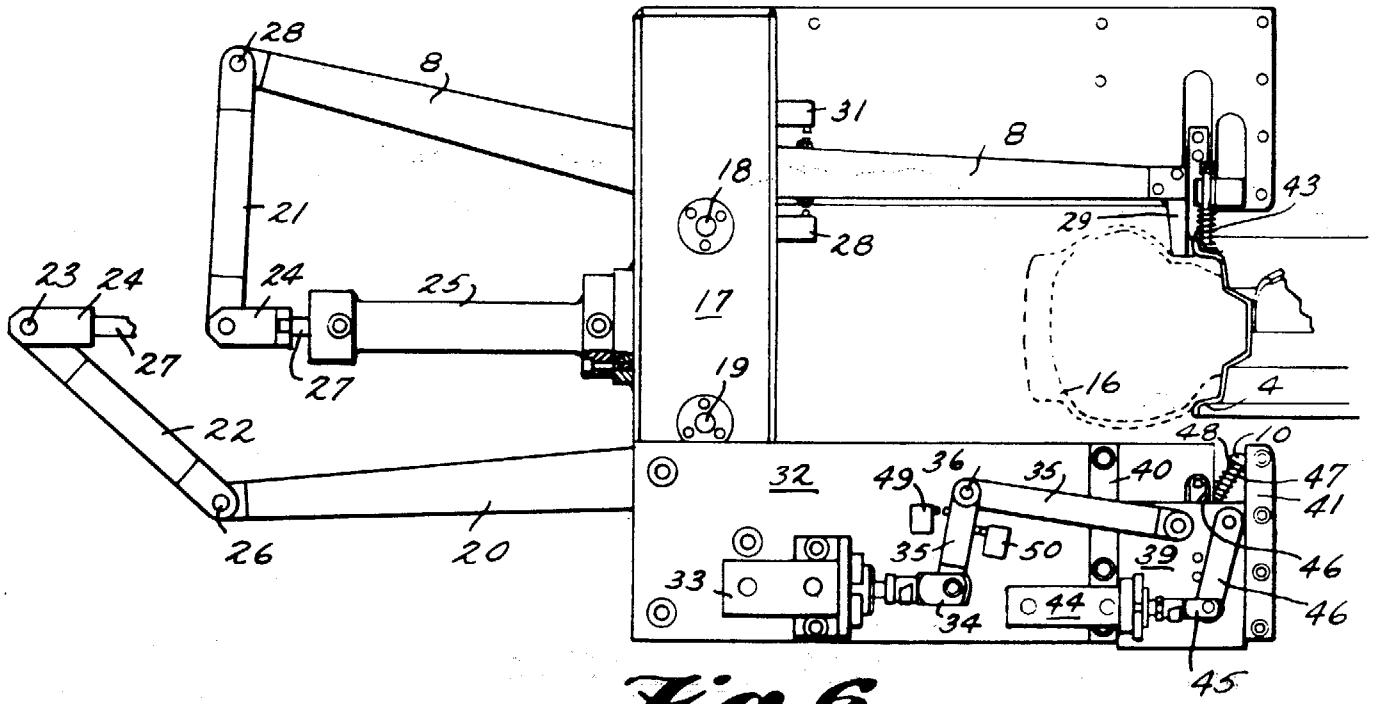
FIG. 6 is a schematic elevation view of the automatic inserting device.

Following is a description of the clip inserting operation with reference to FIGS. 1, 2 and 3. It is assumed that the light point for example in the lower plane of the wheel to be balanced is turned to the inserting plane, in other words the light point in the lower wheel side is exactly over the clip holder 9. The operation of the piston and cylinder arrangement 33 produces an upward movement of the plate 39 with the clip holder 9 toward the rim flanges. The holding clip 6 is fed from an aligning drum 11 over the chutes 53 and 52, respectively, and a distributor 51 to the clip holder 9 before being applied. The holding clip 6 is held on the clip holder 9 by means of an embedded magnet (not shown, below the plate 32) and a comparable magnet 43, respectively. The moment the holding clip 6 is slipped over the rim flange 4, the hammer 10 is moved toward the rim flange under the action of the piston and cylinder arrangement 44 and the angle lever 46. The hammer 10 having the form of a balance weight will fit therefore in the rim flange just as a balance weight, and adjust the holding clip so as to ensure a perfect seat of the balance weight subsequently applied. As soon as the hammer 10 has adjusted the holding clip 6, the levers 8 and 20 release the tire again and the hammer 10 is withdrawn. Plate 39 will return to its normal position downward. Application of the holding clip in the upper wheel side takes place similarly.

I claim

1. In apparatus for automatically balancing a motor vehicle wheel, comprising a tire having two axially spaced tire beads pressed against two respective rim flanges of a wheel rim, including means for mounting said motor vehicle wheel horizontally for rotation about the vertical, longitudinal axis of the wheel at a predetermined speed; means for determining the amount and angular position of the weight require at one rim flange to, together with a balance weight holding clip, balance said wheel in the radial correction plane passing through said one rim flange and for determining the amount and angular position of the weight required 1t 3he other rim flange to, together with a balance weight holding clip, balance said wheel in the radial correction plane passing through said other rim flange, the improvement which comprises:

a holding clip inserting station adjacent said mounting means including means for temporarily forcing both tire beads away from the respective rim flanges at the locations of the aforementioned angular positions;

means for pushing a holding clip onto each rim flange at the location of said angular position on each rim flange, while the tire beads are forced away from the respective rim flanges at the locations of said aforementioned angular positions, so that a first portion of each holding clip lies between the respective tire bead and the respective rim flange and a second portion of each holding clip overlies the exterior of the respective rim flange;

and balance weight form simulating means; means mounting said balance weight form simulating means for movement to between the lower of said rim flanges and the second portion of the holding clip to be pushed thereon, for preventing tilting misorientation of that holding clip during the period of distortion of the respective tire bead by said forcing means.

2. The apparatus of claim 1 wherein said balance weight form simulating means comprises a hammerhead secured to a shaft therefore; wherein said balance weight form simulating means mounting means comprises a second shaft having said hammer shaft secured thereto and projecting laterally therefrom for swinging movement upon rotation of said second shaft; and including means for adjusting the radius of said hammerhead from said second shaft.

3. The apparatus of claim 2 wherein said radius adjusting means includes means for resiliently pressing said hammerhead toward increasing radius and for pressing said hammerhead into resilient contact with the said lower rim flange.

4. The apparatus of claim 1 wherein said pushing means includes magnetic clip holders for magnetically holding said holding clips during installation thereof by said pushing means.

* * * * *